(12) United States Patent
Griffin et al.

(10) Patent No.: US 11,676,059 B2
(45) Date of Patent: Jun. 13, 2023

(54) PERFORMING QUANTUM FILE PATTERN SEARCHING

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 381 days.

(21) Appl. No.: 16/909,477

(22) Filed: Jun. 23, 2020

(65) Prior Publication Data

US 2021/0398008 A1 Dec. 23, 2021

(51) Int. Cl.
G06N 10/00 (2022.01)
G06F 18/22 (2023.01)

(52) U.S. Cl.
CPC ............. G06N 10/00 (2019.01); G06F 18/22 (2023.01)

(58) Field of Classification Search
CPC ........ G06N 10/00; G06N 10/60; G06N 10/80; G06K 9/6215; G06K 9/00536
USPC ......................................................... 706/45
See application file for complete search history.

(56) References Cited

U.S. PATENT DOCUMENTS

| | | | |
|---|---|---|---|
| 7,451,292 B2 | 11/2008 | Routt | |
| 7,639,035 B2 | 12/2009 | Berkley | |
| 7,853,011 B2 | 12/2010 | Kuang et al. | |
| 8,102,185 B2 | 1/2012 | Johansson et al. | |
| 8,434,027 B2 | 4/2013 | Jones | |
| 8,600,051 B2 | 12/2013 | Noh | |
| 8,959,115 B2 | 2/2015 | Marathe | |
| 9,264,226 B2 | 2/2016 | Harrison et al. | |
| 9,495,644 B2 | 11/2016 | Chudak et al. | |
| 9,509,506 B2 | 11/2016 | Hughes et al. | |
| 9,537,953 B1 | 1/2017 | Dadashikelayeh et al. | |

(Continued)

FOREIGN PATENT DOCUMENTS

| CN | 105164704 B | 7/2018 |
|---|---|---|
| CN | 109816112 A | 5/2019 |

(Continued)

OTHER PUBLICATIONS

Barnum, H. et al., "Authentication of Quantum Messages," Proceedings of the 43rd Annual IEEE Symposium on Foundations of Computer Science, Nov. 2002, IEEE, 10 pages.

(Continued)

*Primary Examiner* — James C Kerveros
(74) *Attorney, Agent, or Firm* — Dority & Manning, P.A.

(57) ABSTRACT

Performing quantum file pattern searching is disclosed herein. In one example, a quantum search service executing on a quantum computing device receives, from a requestor, a search request including a search pattern. Upon receiving the search request, the quantum search service accesses a quantum file registry of a quantum file that includes a plurality of qubits. Based on the quantum file registry record, the quantum search service identifies the plurality of qubits, as well as the locations of each qubit of the plurality of qubits. The quantum search service then accesses a plurality of data values stored by the plurality of qubits, and compares the data values to the search pattern. If the quantum search service determines that one or more data values of the plurality of data values correspond to the search pattern, the quantum search service sends to the requestor a search response indicating a match.

20 Claims, 9 Drawing Sheets

(56) References Cited

U.S. PATENT DOCUMENTS

| | | | |
|---|---|---|---|
| 9,774,401 | B1 | 9/2017 | Borill |
| 9,847,913 | B2 | 12/2017 | Kanda et al. |
| 9,887,976 | B2 | 2/2018 | Hughes et al. |
| 10,331,658 | B2* | 6/2019 | Pennefather .......... G06F 16/148 |
| 10,592,216 | B1 | 3/2020 | Richardson et al. |
| 2003/0121028 | A1 | 6/2003 | Coury et al. |
| 2005/0193221 | A1 | 9/2005 | Yoneyama |
| 2012/0093521 | A1 | 4/2012 | Harrison et al. |
| 2012/0124092 | A1 | 5/2012 | Teranishi et al. |
| 2013/0308956 | A1 | 11/2013 | Meyers et al. |
| 2014/0365843 | A1 | 12/2014 | Ashikhmin |
| 2016/0071021 | A1 | 3/2016 | Raymond |
| 2017/0351974 | A1 | 12/2017 | Rose et al. |
| 2018/0091440 | A1 | 3/2018 | Dadashikelayeh et al. |
| 2018/0144262 | A1 | 3/2018 | Roetteler et al. |
| 2018/0181685 | A1 | 6/2018 | Roetteler et al. |
| 2018/0336371 | A1 | 11/2018 | Fortmann et al. |
| 2018/0365585 | A1 | 12/2018 | Smith et al. |
| 2019/0042971 | A1 | 2/2019 | Zou |
| 2019/0179730 | A1 | 6/2019 | Geller et al. |
| 2020/0074346 | A1 | 3/2020 | Griffin et al. |
| 2020/0125402 | A1 | 4/2020 | Griffin et al. |
| 2020/0133947 | A1* | 4/2020 | Wang .................. G06F 17/11 |
| 2020/0184025 | A1 | 6/2020 | Horii et al. |
| 2020/0184031 | A1 | 6/2020 | Horii |
| 2020/0201655 | A1 | 6/2020 | Griffin et al. |
| 2020/0227522 | A1 | 7/2020 | Leipold et al. |
| 2020/0272926 | A1* | 8/2020 | Chaplin .............. G06N 10/00 |
| 2020/0301562 | A1 | 9/2020 | Gupta et al. |
| 2020/0313063 | A1 | 10/2020 | Pollanen et al. |
| 2020/0374211 | A1 | 11/2020 | Griffin et al. |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |
| 2021/0182724 | A1 | 6/2021 | Zou et al. |
| 2021/0303155 | A1 | 9/2021 | Meister et al. |
| 2022/0108318 | A1* | 4/2022 | Ramasamy .......... G06Q 20/405 |

FOREIGN PATENT DOCUMENTS

| | | | |
|---|---|---|---|
| JP | 6465876 | B2 | 2/2019 |
| WO | 2016206498 | A1 | 12/2016 |
| WO | 2018111242 | A1 | 6/2018 |

OTHER PUBLICATIONS

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" WIRED, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://spectrum.ieee.org/tech-talk/computing/hardware/a-quantum-bus-for-quantum-computers, 3 pages.

Gühne, O., et al., "Entanglement detection," Physics Reports, vol. 474, No. 1, Feb. 27, 2009, 90 pages.

Lee, C., "New form of qubit control may yield longer computation times," Ars Technica, Jan. 26, 2018, WIRED Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

Yang, C., et al., "Entanglement generation and quantum information transfer between spatiallY-separated qubits in different cavities," New Journal of Physics, vol. 15, Nov. 1, 2013, 19 pages.

Notice of Allowance for U.S. Appl. No. 16/227,747, dated Jun. 10, 2021, 7 pages.

Cheng, S.T. et al., "Quantum Switching and Quantum Merge Sorting," IEEE Transactions on Circuits and Systems I: Regular Papers, vol. 53, Issue 2, Feb. 2006, IEEE, 10 pages.

Whitehouse, L., "Data deduplication methods: Block-level versus byte-level dedupe," Nov. 24, 2008, https://www.techtarget.com/searchdatabackup/tip/Data-deduplication-methods-Block-level-versus-byte-level-dedupe, 2 pages.

Applicant-Initiated Interview Summary for U.S. Appl. No. 15/930,025, dated Dec. 17, 2021, 3 pages.

Non-Final Office Action for U.S. Appl. No. 16/912,091, dated Jan. 27, 2022, 14 pages.

U.S. Appl. No. 15/930,025, filed May 12, 2020.

U.S. Appl. No. 16/884,928, filed May 27, 2020.

U.S. Appl. No. 16/859,571, filed Apr. 27, 2020.

Non-Final Office Action for U.S. Appl. No. 15/930,025, dated Oct. 1, 2021, 10 pages.

Non-Final Office Action for U.S. Appl. No. 16/859,571, dated Oct. 28, 2021, 9 pages.

Notice of Allowance for U.S. Appl. No. 16/912,200, dated Oct. 13, 2022, 9 pages.

Notice of Allowance for U.S. Appl. No. 16/912,091, dated Sep. 14, 2022, 10 pages.

Notice of Allowance and Examiner-Initiated Interview Summary for U.S. Appl. No. 15/930,025, dated Apr. 8, 2022, 13 pages.

Notice of Allowance, Examiner's Amendment, and Examiner-Initiated Interview Summary for U.S. Appl. No. 16/912,045, dated Oct. 4, 2022, 12 pages.

Non-Final Office Action for U.S. Appl. No. 16/912,200, dated May 12, 2022, 39 pages.

Non-Final Office Action for U.S. Appl. No. 16/912,045, dated Apr. 14, 2022, 9 pages.

Final Office Action for U.S. Appl. No. 16/912,091, dated Jun. 20, 2022, 14 pages.

Non-Final Office Action for U.S. Appl. No. 16/884,928, dated Nov. 4, 2022, 49 pages.

Non-Final Office Action for U.S. Appl. No. 16/859,571, dated May 20, 2022, 21 pages.

Final Office Action and Examiner Interview Summary for U.S. Appl. No. 16/859,571, dated Dec. 8, 2022, 14 pages.

* cited by examiner

PERFORMING QUANTUM FILE PATTERN SEARCHING

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to programmatically manipulate quantum files comprising a plurality of qubits will be desirable.

SUMMARY

The examples disclosed herein implement a quantum file management system that performs pattern searching of quantum files that each comprise a plurality of qubits. A quantum search service, executing on a processor device of a quantum computing device, receives a search request from a requestor (e.g., a quantum application, as a non-limiting example). The search request specifies a search pattern, which may include, as non-limiting examples, a plurality of literals or a regular expression. In some examples, the search request may also indicate a specific quantum file to be searched, a specific location to be searched, and/or a specific one or more qubits to be searched. Upon receiving the search request, the quantum search service accesses a quantum file registry of a quantum file that includes a plurality of qubits. The quantum file may be, e.g., a quantum file identified by the search request, a quantum file at the location specified by the search request, and/or a quantum file containing the one or more qubits specified by the search request.

Based on the quantum file registry record, the quantum search service identifies the plurality of qubits of the quantum file, as well as the locations of each qubit of the plurality of qubits. The quantum search service then accesses a plurality of data values stored by the plurality of qubits, and compares the data values to the search pattern. If the quantum search service determines that one or more data values of the plurality of data values correspond to the search pattern (i.e., the one or more data values exactly match a corresponding one or more literals of the search pattern, or satisfy a regular expression of the search pattern), the quantum search service sends to the requestor a search response indicating a match. The search response according to some examples may also include an identification of the quantum file and/or an identification of the one or more qubits storing the one or more data values that correspond to the search pattern. In some examples, the quantum search service may repeat the operations described above on multiple quantum files, until all matches are identified and/or all locations have been searched.

In another example, a method for performing quantum file pattern searching is provided. The method comprises receiving, from a requestor, a search request comprising a search pattern. The method further comprises accessing a quantum file registry record of a quantum file comprising a plurality of qubits. The method also comprises identifying, based on the quantum file registry record, the plurality of qubits and a location of each qubit of the plurality of qubits. The method additionally comprises accessing, based on the identifying, a plurality of data values stored by the plurality of qubits. The method further comprises comparing the plurality of data values with the search pattern. The method also comprises determining, based on the comparing, that one or more data values of the plurality of data values correspond to the search pattern. The method additionally comprises sending a search response to the requestor indicating that the one or more data values of the plurality of data values correspond to the search pattern.

In another example, a quantum computing system for performing quantum file pattern searching is provided. The quantum computing system comprises a quantum computing device that comprises a memory and at least one processor device coupled to the memory. The at least one processor device is to receive, from a requestor, a search request comprising a search pattern. The at least one processor device is further to access a quantum file registry record of a quantum file comprising a plurality of qubits. The at least one processor device is also to identify, based on the quantum file registry record, the plurality of qubits and a location of each qubit of the plurality of qubits. The at least one processor device is additionally to access, based on the identifying, a plurality of data values stored by the plurality of qubits. The at least one processor device is further to compare the plurality of data values with the search pattern. The at least one processor device is also to determine, based on the comparing, that one or more data values of the plurality of data values correspond to the search pattern. The at least one processor device is additionally to send a search response to the requestor indicating that the one or more data values of the plurality of data values correspond to the search pattern.

In another example, a computer program product is provided. The computer program product comprises a non-transitory computer-readable medium having stored thereon computer-executable instructions which, when executed, cause a processor device to receive, from a requestor, a search request comprising a search pattern. The computer-executable instructions further cause the processor device to access a quantum file registry record of a quantum file comprising a plurality of qubits. The computer-executable instructions also cause the processor device to identify, based on the quantum file registry record, the plurality of qubits and a location of each qubit of the plurality of qubits. The computer-executable instructions additionally cause the processor device to access, based on the identifying, a plurality of data values stored by the plurality of qubits. The computer-executable instructions further cause the processor device to compare the plurality of data values with the search pattern. The computer-executable instructions also cause the processor device to determine, based on the comparing, that one or more data values of the plurality of data values correspond to the search pattern. The computer-executable instructions additionally cause the processor device to send a search response to the requestor indicating that the one or more data values of the plurality of data values correspond to the search pattern.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
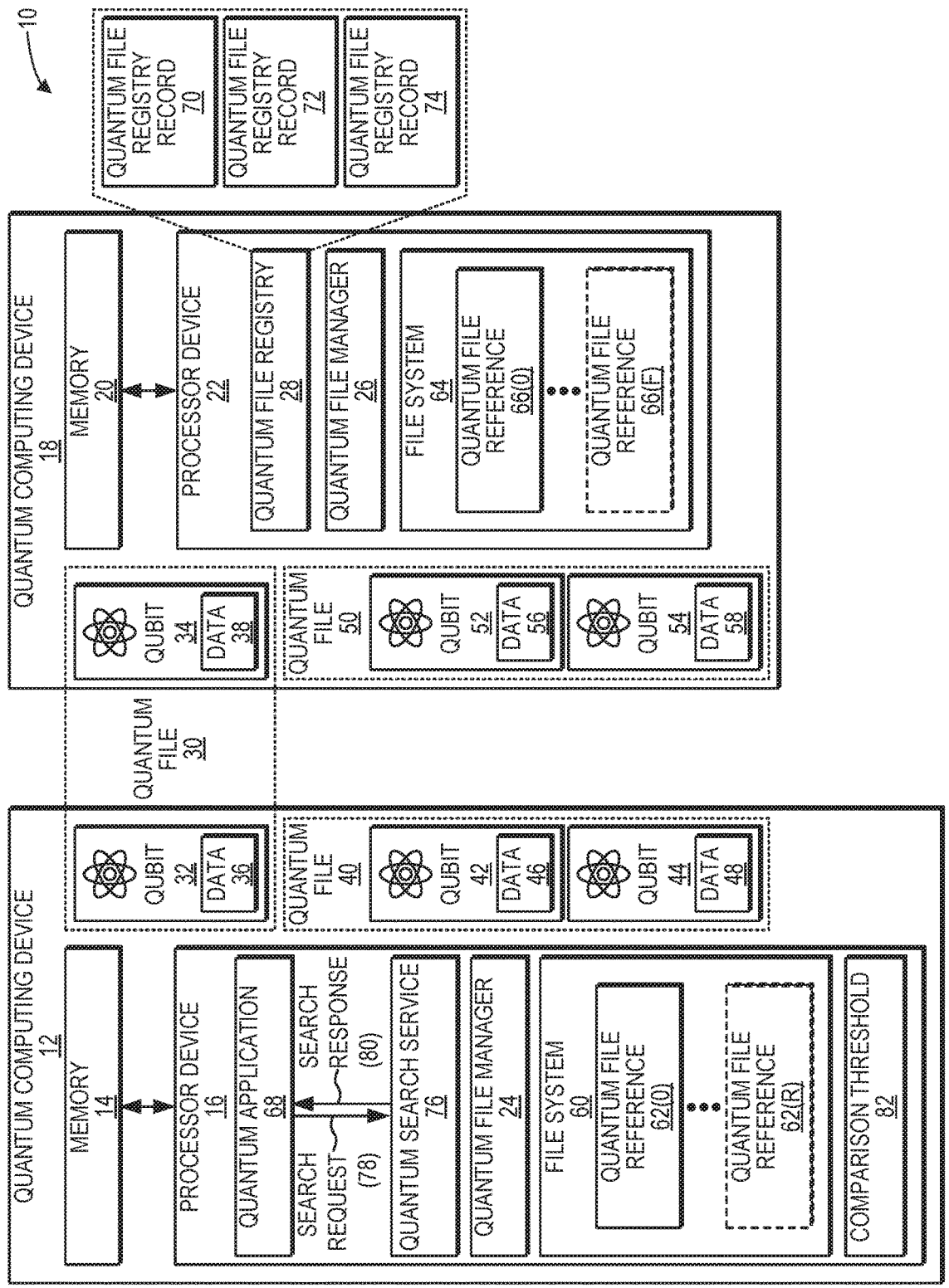
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. As quantum computing continues to increase in popularity and become more commonplace, an ability to programmatically manipulate quantum files comprising a plurality of qubits will be desirable.

In this regard, the examples disclosed herein implement a quantum file management system that performs pattern searching of quantum files that each comprise a plurality of qubits. A quantum search service, executing on a processor device of a quantum computing device, receives a search request from a requestor (e.g., a quantum application, as a non-limiting example). The search request specifies a search pattern, which may include, as non-limiting examples, a plurality of literals or a regular expression. In some examples, the search request may also indicate a specific quantum file to be searched, a specific location to be searched, and/or a specific one or more qubits to be searched. Upon receiving the search request, the quantum search service accesses a quantum file registry of a quantum file that includes a plurality of qubits. The quantum file may be, e.g., a quantum file identified by the search request, a quantum file at the location specified by the search request, and/or a quantum file containing the one or more qubits specified by the search request.

Based on the quantum file registry record, the quantum search service identifies the plurality of qubits of the quantum file, as well as the locations of each qubit of the plurality of qubits. The quantum search service then accesses a plurality of data values stored by the plurality of qubits, and compares the data values to the search pattern. If the quantum search service determines that one or more data values of the plurality of data values correspond to the search pattern (i.e., the one or more data values exactly match a corresponding one or more literals of the search pattern, or satisfy a regular expression of the search pattern), the quantum search service sends to the requestor a search response indicating a match. The search response according to some examples may also include an identification of the quantum file and/or an identification of the one or more qubits storing the one or more data values that correspond to the search pattern. In some examples, the quantum search service may repeat the operations described above on multiple quantum files, until all matches are identified and/or all locations have been searched.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 may be close in physical proximity to one another, or may be relatively long distances from one another (e.g., hundreds or thousands of miles from one another). The quantum computing device 12 and the quantum computing device 18 operate in quantum environments, but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional classical network connection (not shown) and/or via a quantum channel (not shown) over which qubits may be transmitted.

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 24 and 26, which operate to implement quantum files on the quantum computing device 12 and the quantum computing device 18, respectively. The quantum file management system also includes a quantum file registry 28 that includes metadata regarding each quantum file implemented in the quantum computing system 10, as discussed in greater detail below.

In the example of FIG. 1, the quantum computing system 10 implements a quantum file 30 that is made up of two (2) qubits: a qubit 32 that is hosted on the quantum computing device 12, and a qubit 34 that is hosted on the quantum computing device 18. The qubit 32 stores a data value ("DATA") 36, while the qubit 34 stores a data value ("DATA") 38. The quantum computing system 10 also implements a quantum file 40 that is made up of qubits 42 and 44 storing data values ("DATA") 46 and 48, respectively, and a quantum file 50 that is made up of qubits 52 and 54 storing data values ("DATA") 56 and 58, respectively. For purposes of this example, the quantum files 30 and 40 are "owned" by the quantum computing device 12, while the quantum file 50 is "owned" by the quantum computing device 18. However, it is to be understood that ownership of the quantum files 30, 40, and 50 may be migrated or transitioned from one quantum computing device to another. It is to be further understood that the quantum files 30, 40, and 50 in some examples may comprise more qubits than illustrated in FIG. 1.

The quantum computing device 12 includes a file system 60 that includes one or more quantum file references 62(0)-62(R). Each of the quantum file references 62(0)-62(R) corresponds to a quantum file that is maintained in the quantum file registry 28 and that is "owned" by the quantum computing device 12. Thus, for example, the quantum file reference 62(0) may correspond to the quantum file 30. Likewise, the quantum computing device 18 includes a file system 64 that includes one or more quantum file references 66(0)-66(F). It is to be understood that the file system 64 provides functionality corresponding to the functionality of the file system 60 described herein.

In exemplary operation, a quantum file such as the quantum file 30 may be accessed by a requestor (e.g., a quantum application 68) via the quantum file reference 62(0), which is identified by the quantum application 68 via an identifier (not shown). The quantum application 68 provides the identifier to the quantum file manager 24 via any suitable inter-process communications mechanism, such as an application programming interface (API) or the like. In some examples, the quantum file manager 24 may be an integral part of a quantum operating system, and the appropriate intercommunication mechanisms between the quantum application 68 and the quantum file manager 24 may be generated in response to certain programming instructions, such as reading, writing, or otherwise accessing the quantum file 30 while the quantum application 68 is being compiled.

The quantum file manager 24 then accesses the file system 60. Based on the quantum file identifier provided by the quantum application 68, the quantum file manager 24 accesses the quantum file reference 62(0). The quantum file reference 62(0) includes information about the quantum file 30 such as an internal quantum file identifier for the quantum file 30, a location of a Quantum Assembly Language (QASM) file that contains programming instructions that access the quantum file 30, and/or metadata for the quantum file 30 (e.g., a creation timestamp of the quantum file 30, a last modification timestamp of the quantum file 30, and/or a current user of the quantum file 30, as non-limiting examples). The quantum file reference 62(0) may also identify each qubit that makes up the quantum file 30 (i.e., the qubits 32 and 34, in this example).

In some examples, data may be spread over the qubits 32 and 34 of the quantum file 30 in a manner that dictates that the qubits 32 and 34 must be accessed in some sequential order for the data to have contextual meaning. Accordingly, some examples may provide that the order in which the qubits 32 and 34 are identified in the quantum file reference 62(0) may correspond to the appropriate order in which the qubits 32 and 34 should be accessed. In other examples, the quantum file reference 62(0) may have one or more additional fields identifying the appropriate order. Some examples may also provide that the quantum file reference 62(0) includes qubit entanglement status fields that indicate entanglement status information about the qubits 32 and 34, quantum superposition status fields that indicate superposition status information about the qubits 32 and 34, and/or superdense status fields that indicate superdense status information about the qubits 32 and 34.

In the example of FIG. 1, the quantum file manager 24, upon receiving an access request to a quantum file such as the quantum file 30, may access the quantum file registry 28 (using, e.g., a linking service (not shown)) to determine a current status of the quantum file 30. The quantum file registry 28 of FIG. 1 comprises a plurality of quantum file registry records 70, 72, and 74, each of which corresponds to a quantum file implemented in the quantum computing system 10. In this example, the quantum file registry record 70 corresponds to the quantum file 30, while the quantum file registry record 72 corresponds to the quantum file 40 and the quantum file registry record 74 corresponds to the quantum file 50.

Each of the quantum file registry records 70, 72, and 74 includes current metadata regarding the corresponding quantum files 30, 40, and 50. The metadata may include, as non-limiting examples, an internal file identifier of each corresponding quantum file, an indicator of a number of qubits that make up the corresponding quantum file, and, for each qubit of the number of qubits, a qubit identification field and an entanglement status field. The quantum file registry records 70, 72, and 74 each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like. Some examples may also provide that the quantum file registry records 70, 72, and 74 each further include qubit entanglement status fields, quantum superposition status fields, and/or superdense status fields for each qubit of the corresponding quantum file.

The quantum file manager 24 updates the quantum file reference 62(0) with the information from the quantum file registry record 70 and the outcome of any checks, and also updates the timestamp field of the quantum file reference 62(0) with the current time. The quantum file manager 24 then returns control to the quantum application 68, passing the quantum application 68 at least some of the updated information contained in the quantum file reference 62(0). The quantum application 68 may then initiate actions against the qubits 32 and 34, such as read actions, write actions, or the like.

One function provided by the quantum file managers 24 and 26 of FIG. 1 is pattern searching of quantum files. Accordingly, in the example of FIG. 1, the quantum computing device 12 implements a quantum search service 76 that provides quantum pattern search functionality. The quantum search service 76 is executed by the processor device 16, and receives a search request 78 from a requestor, such as the quantum application 68, to perform a pattern search. The search request 78 includes a search pattern (not shown) to which data values stored by the qubits of one or more quantum files will be compared. As discussed below with respect to FIGS. 2A and 2B, the search pattern of the search request 78 may include a plurality of literals (such as, e.g., a string), or may include a regular expression. In some examples, the search request 78 may also include additional parameters that further define the desired pattern search. For instance, the search request 78 may include an identification of a specific quantum file to be searched, an identification of a specific location (e.g., a particular device such as the quantum computing device 12 and/or the quantum computing device 18 or a particular directory or file structure, as non-limiting examples) to be searched, and/or an identification of a specified plurality of qubits to be searched. Elements of the search request 78 according to some examples are discussed in greater detail below with respect to FIG. 3.

Upon receiving the search request 78, the quantum search service 76 accesses a quantum file registry record of a quantum file to be searched. In the example of FIG. 1, the quantum search service 76 may access the quantum file registry record 70 corresponding to the quantum file 30. The quantum search service 76 uses the quantum file registry record 70 to identify the plurality of qubits 32 and 34 of the quantum file 30, and also to identify a location of each of the qubits 32 and 34. The quantum search service 76 then accesses the data values 36 and 38 stored in the qubits 32 and 34, respectively, and compares the data values 36 and 38 to the search pattern of the search request 78.

If the quantum search service 76 determines that the data values 36 and 38 correspond to the search pattern of the search request 78, the quantum search service 76 sends a search response 80 to the quantum application 68. The search response 80 indicates to the quantum application 68 that the data values 36 and 38 correspond to the search pattern of the search request 78. In some examples, the search response 80 may include an identification of the quantum file 30 and/or an identification of the qubits 32 and 34 that store the data values 36 and 38 that correspond to the search pattern of the search request 78. In examples in which multiple pluralities of qubits and/or multiple quantum files are searched, each set of qubits that store data values corresponding to the search pattern of the search request 78 and/or each quantum file storing each set of qubits may be identified by the search response 80. If none of the data values stored by the qubits of the searched quantum file(s) correspond to the search pattern of the search request 78, the search response 80 according to some examples may indicate that no matches were found.

Before performing a pattern search operation, one or more checks may be performed on the qubits to be searched. For example, the quantum search service 76 may first ensure that the qubits 32 and 34 of the quantum file 30 are not entangled (i.e., are in an entanglement state of "not entangled") and/or are not in a state of superposition prior to performing the pattern search operation. Some examples may provide that the quantum search service 76 also obtains exclusive access to the qubits 32 and 34 before attempting the pattern search operation. Obtaining exclusive access may comprise operations for ensuring that no other processes are operating on the qubits 32 and 34, and/or indicating that access to the qubits 32 and 34 is locked to other processes while the pattern search operation is underway.

Some examples may provide that the qubits 32 and 34 on which a pattern search is to be performed may be in a state of superposition at the time the pattern search is initiated. In such examples, instead of accessing the data values 36 and 38 a single time, the quantum search service 76 may perform a plurality of accesses of each of the data values 36 and 38, and further may perform a plurality of comparisons of the data values 36 and 38 with the search pattern of the search request 78. To determine whether the data values 36 and 38 correspond to the search pattern, the quantum search service 76 first determines a number of the plurality of comparisons in which the data values 36 and 38 match the search pattern. For instance, the quantum search service 76 may perform a total of 20 comparisons, and may determine that the data values 36 and 38 match the search pattern in 16 of those 20 comparisons. The quantum search service 76 may then determine that the data values 36 and 38 correspond to the search pattern if the number of comparisons in which the data values 36 and 38 match the search pattern exceeds a comparison threshold 82. In the example described above, if the comparison threshold 82 has a value of 15, the quantum search service 76 may determine that the data values 36 and 38 correspond to the search pattern based on the number of comparisons in which the data values 36 and 38 match the search pattern (16) exceeding the comparison threshold 82 (15).

Figure 2A:
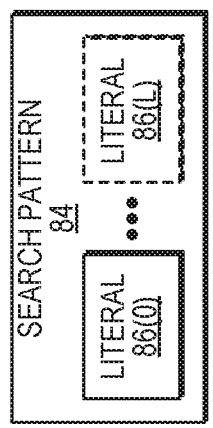
FIGS. 2A and 2B are block diagrams illustrating constituent elements of a search pattern specified by the search request of FIG. 1, according to some examples.
Figure 2B:
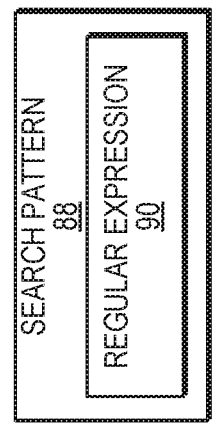

To illustrate constituent elements of the search pattern of the search request 78 of FIG. 1 according to some examples, FIGS. 2A and 2B are provided. In FIG. 2A, a search pattern 84, corresponding in functionality to a search pattern of the search request 78 of FIG. 1, is shown. The search pattern 84 includes one or more literals 86(0)-86(L). Each of the one or more literals 86(0)-86(L) represents a fixed value, and collectively the literal(s) 86(0)-86(L) may represent, e.g., a string value. When comparing a plurality of data values (such as the data values 36 and 38 of FIG. 1) to the one or more literals 86(0)-86(L), the quantum search service 76 of FIG. 1 may first identify a first one of the data values 36 and 38 as matching a first one of the literal(s) 86(0)-86(L). The quantum search service 76 may then compare each subsequent one of the data values 36 and 38 with respective subsequent ones of the literal(s) 86(0)-86(L). The quantum search service 76 may discontinue the comparing as soon as a mismatch between one of the data values 36 and 38 and a corresponding literal 86(0)-86(L) is identified.

In the example of FIG. 2B, a search pattern 88, also corresponding in functionality to a search pattern of the search request 78 of FIG. 1, is shown. The search pattern 88 includes a regular expression 90. The regular expression 90 may employ any conventional regular expression syntax for representing patterns for matching text. The use of the regular expression 90 may provide a more flexible mechanism for specifying the search pattern 88 in comparison to the use of the literal(s) 86(0)-86(L) of FIG. 2A.

Figure 3:
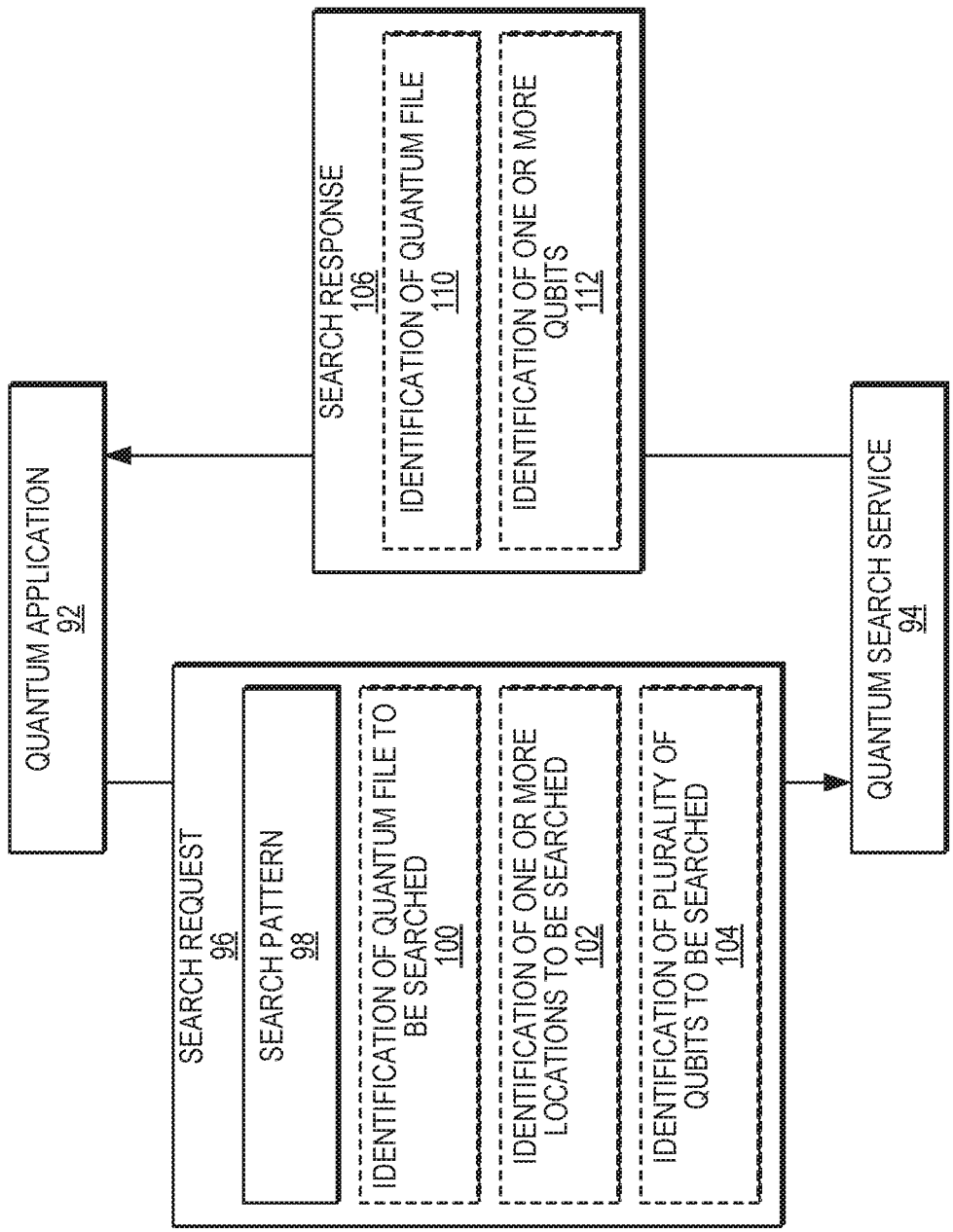
FIG. 3 is a block diagram illustrating constituent elements of the search request and the search response of FIG. 1, according to some examples.

FIG. 3 illustrates constituent elements of search requests and search responses, such as the search request 78 and the search response 80 of FIG. 1, respectively, according to some examples. As seen in FIG. 3, a quantum application 92, acting as a requestor, is communicating with a quantum search service 94 that corresponds in functionality with the quantum search service 76 of FIG. 1. To initiate a quantum pattern search, the quantum application sends a search request 96 to the quantum search service 94. The search request 96 includes a search pattern 98, which corresponds in functionality to one of the search patterns 84 and 88 of FIGS. 2A and 2B, respectively, according to some examples. In some examples, the search request 96 may include an identification 100 of a quantum file to be searched (e.g., one of the quantum files 30, 40, or 50 of FIG. 1). By specifying the identification 100, the pattern search operation may be limited to a particular quantum file.

Some examples may provide that the search request 96 includes an identification 102 of one or more locations to be searched. As non-limiting examples, the identification 102 may correspond to one or more of the quantum computing devices 12 and 18, and/or may indicate a specific file system structure (e.g., a storage medium identifier, a directory identifier, and/or a folder identifier) provided by one or more of the quantum computing devices 12 and 18. According to some examples, the search request 96 may include an identification 104 of a plurality of qubits to be searched, such as the qubits 32, 34, 42, 44, 52, and 54 of FIG. 1. In such examples, the pattern search will be limited to only the specified plurality of qubits.

Upon completing the pattern search, the quantum search service 94 communicates the results of the search to the quantum application 92 by sending a search response 106 to the quantum application 92. In some examples, the search response 106 may include an identification 110 of a quantum file containing qubits that store data values corresponding to the search pattern 98. Some examples may provide that the search response 106 includes more specific results by providing an identification 112 of the one or more qubits storing data values that correspond to the search pattern 98.

Figure 4A:
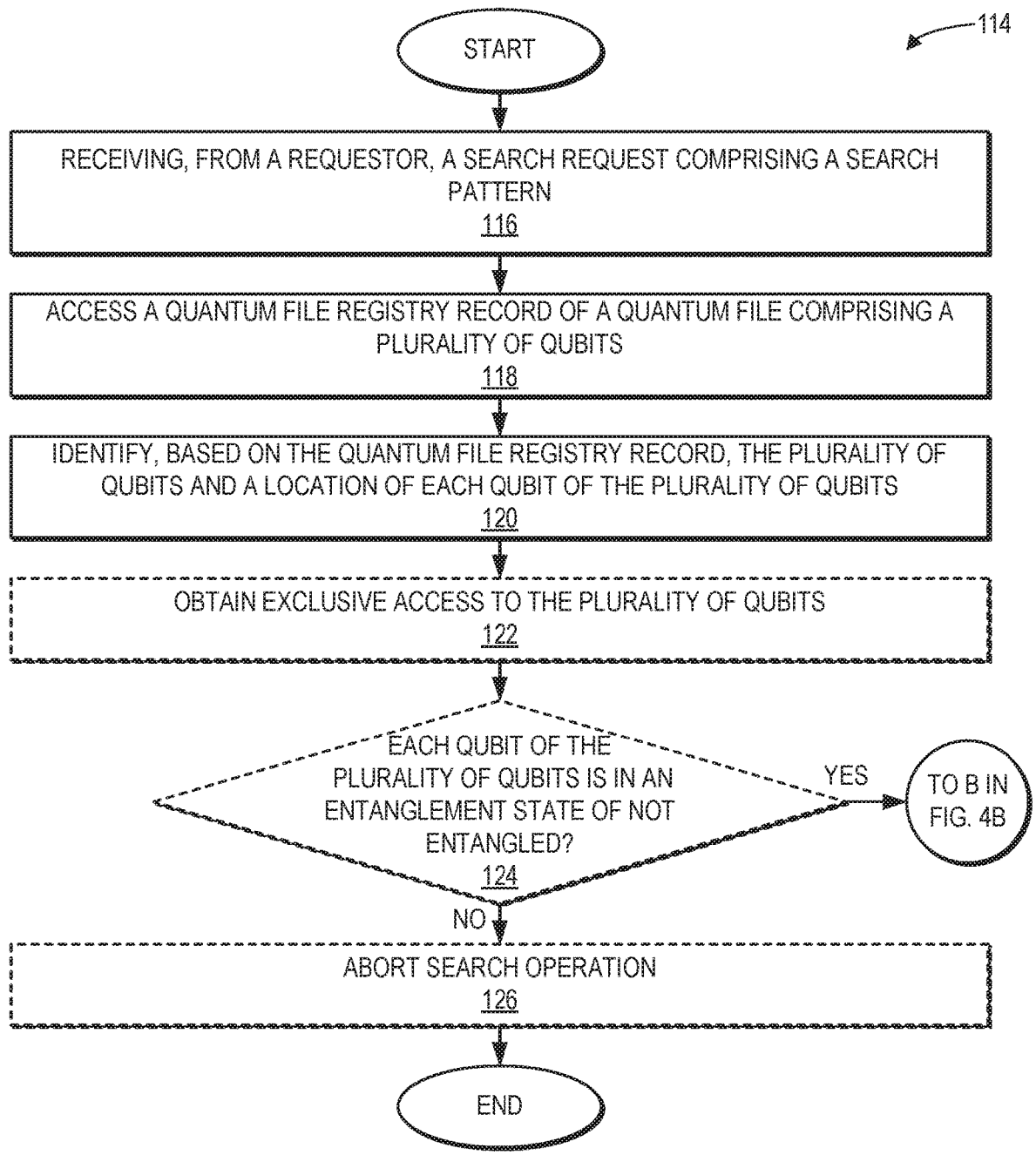
FIGS. 4A-4C are flowcharts illustrating operations for performing pattern searching of quantum files, according to one example.
Figure 4B:
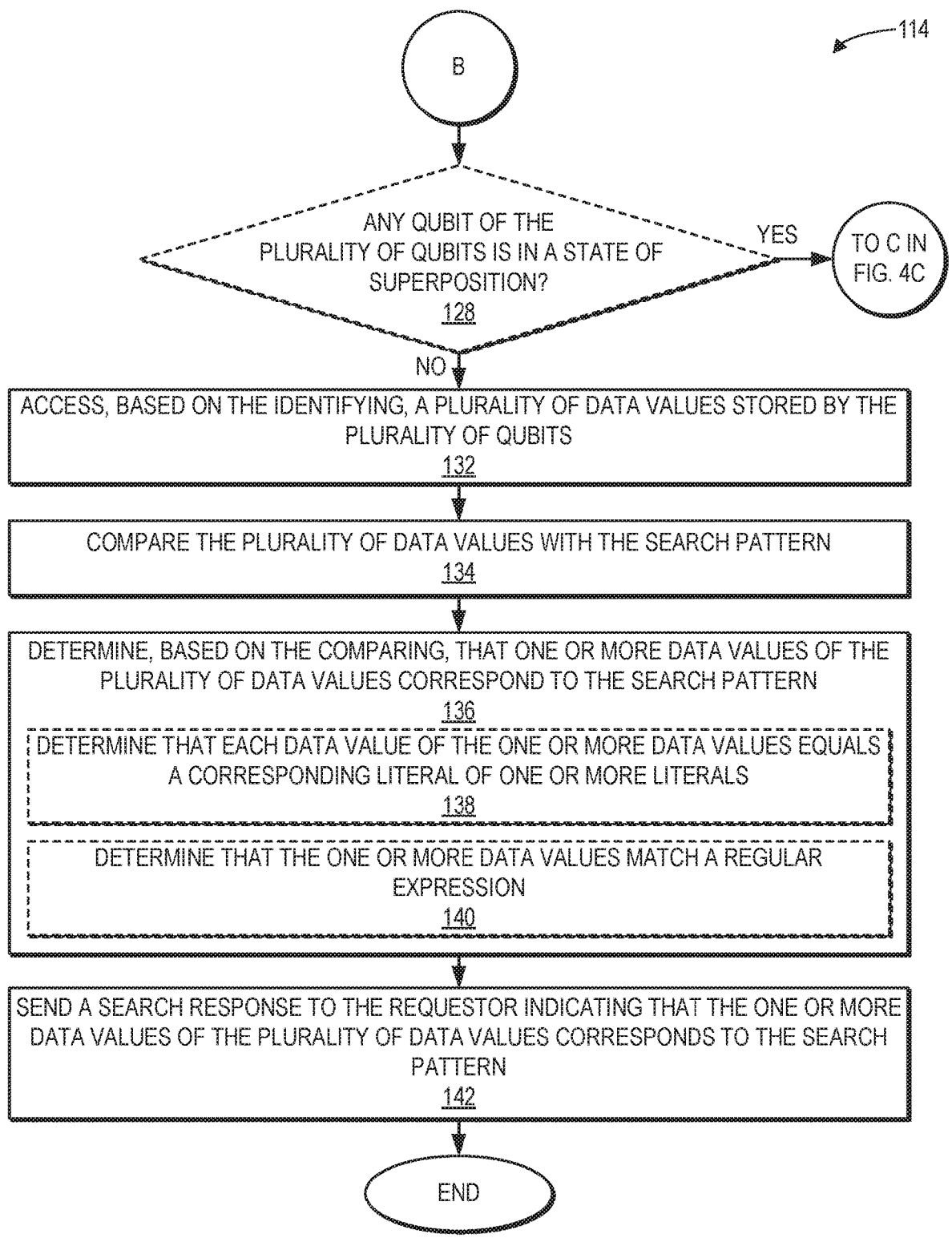
Figure 4C:
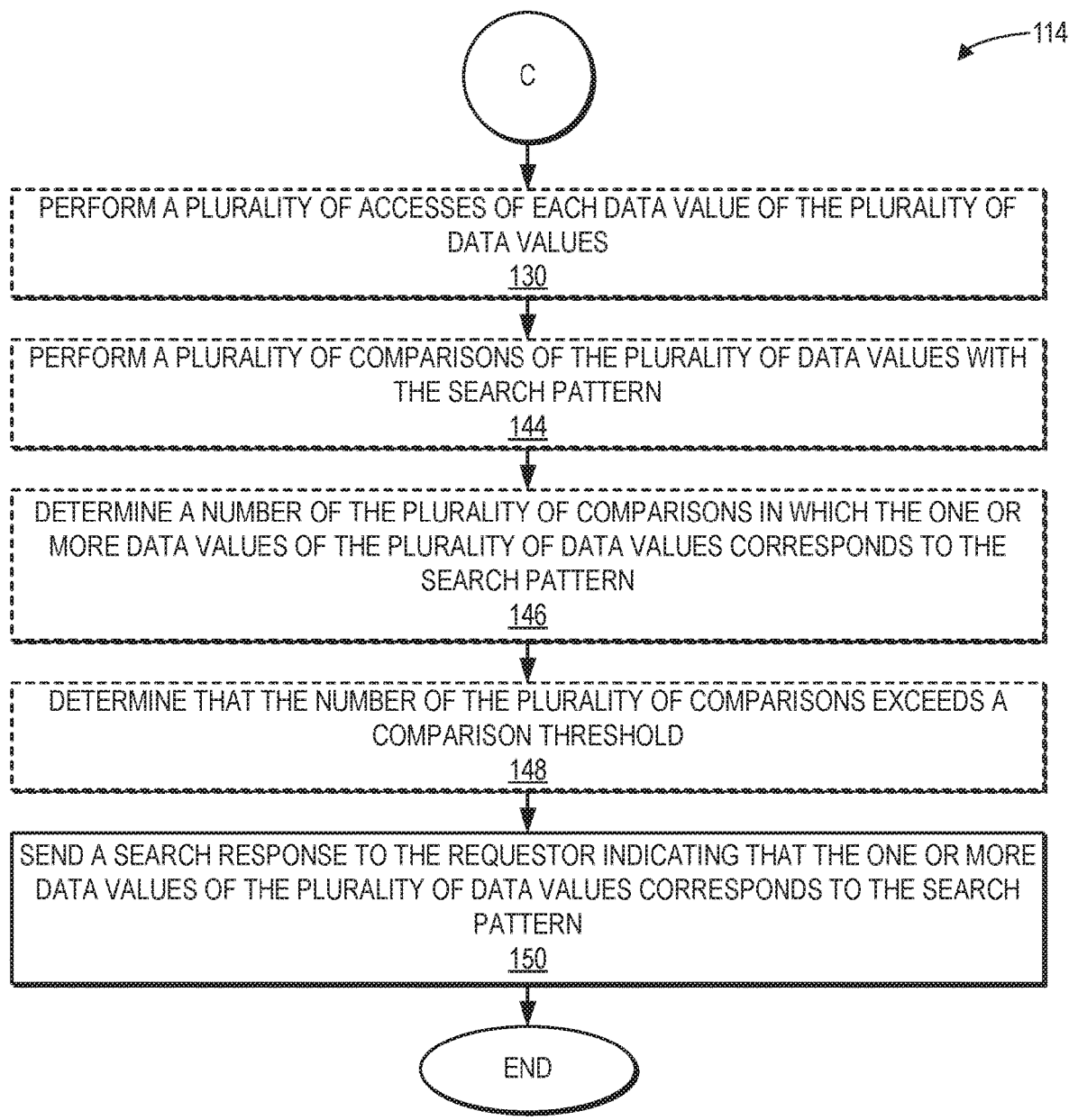

FIGS. 4A-4C provide a flowchart 114 showing exemplary operations for performing quantum file pattern searching, according to some examples. For the sake of clarity, elements of FIGS. 1, 2A-2B, and 3 are referenced in describing FIGS. 4A-4C. Operations in FIG. 4A begin with a quantum search service (such as the quantum search service 76 of FIG. 1) receiving, from a requestor (e.g., the quantum application 68 of FIG. 1 ("requestor 68")) the search request 78 comprising a search pattern (such as the search pattern 98 of FIG. 3) (block 116). The quantum search service 76 next accesses a quantum file registry record (e.g., the quantum file registry record 70 of FIG. 1) of the quantum file 30 comprising the plurality of qubits 32 and 34 (block 118). Based on the quantum file registry record 70, the quantum search service 76 identifies the plurality of qubits 32 and 34 and a location of each qubit of the plurality of qubits 32 and 34 (block 120).

In some examples, the quantum search service 76 may next obtain exclusive access to the plurality of qubits 32 and 34 (block 122). Some examples may provide that the quantum search service 76 also determines whether each qubit of the plurality of qubits 32 and 34 is in an entanglement state of not entangled (block 124). If not (i.e., if one of the qubits 32 and 34 is entangled with another qubit), the quantum search service 76 aborts the search operation (block 126). However, if the quantum search service 76 determines at decision block 124 that the qubits 32 and 34 are in an entanglement state of not entangled, processing continues at block 128 of FIG. 4B.

Referring now to FIG. 4B, the quantum search service 76 according to some examples may determine whether any qubit of the plurality of qubits 32 and 34 is in a state of superposition (block 128). If so, processing continues at block 130 of FIG. 4C. However, if the quantum search service 76 determines at decision block 128 that none of the plurality of qubits 32 and 34 are in a state of superposition, the quantum search service 76 accesses the plurality of data values 36 and 38 stored by the plurality of qubits 32 and 34 (block 132). The quantum search service 76 compares the plurality of data values 36 and 38 with the search pattern 98 (block 134).

The quantum search service 76 then determines, based on the comparing, that one or more data values of the plurality of data values 36 and 38 correspond to the search pattern 98 (block 136). In some examples, the operations of block 136 for determining that the one or more data values of the plurality of data values 36 and 38 correspond to the search pattern 98 may include determining that each data value of the one or more data values 36 and 38 equals a corresponding literal of one or more literals, such as the one or more literals 86(0)-86(L) of FIG. 2A (block 138). Some examples may provide that the operations of block 136 for determining that the one or more data values of the plurality of data values 36 and 38 correspond to the search pattern 98 include determining that the one or more data values of the plurality of data values 36 and 38 match a regular expression, such as the regular expression 90 of FIG. 2B (block 140). The quantum search service 76 sends a search response, such as the search response 80 of FIG. 1, to the requestor 68 indicating that the one or more data values of the plurality of data values 36 and 38 correspond to the search pattern 98 (block 142).

Turning now to FIG. 4C, if the quantum search service 76 determines at decision block 128 of FIG. 4B that any qubit of the plurality of qubits 32 and 34 are in a state of superposition, the quantum search service 76 may need to perform multiple accesses and comparisons to determine statistically whether the data values 36 and 38 correspond to the search pattern 98. Accordingly, the quantum search service 76 in some examples may perform a plurality of accesses of the plurality of data values 36 and 38 (block 130). The operations of block 130 may be considered to correspond to the operations of block 132 of FIG. 4B. The quantum search service 76 next performs a plurality of comparisons of the plurality of data values 36 and 38 with the search pattern 98 (block 144). The operations of block 144 may be considered to correspond to the operations of block 134 of FIG. 4B.

The quantum search service 76 then determines a number of the plurality of comparisons in which the one or more data values of the plurality of data values 36 and 38 match the search pattern 98 (block 146). The quantum search service 76 determines that the number of the plurality of comparisons exceeds a comparison threshold, such as the comparison threshold 82 of FIG. 1 (block 148). The operations of blocks 146 and 148 may be considered to correspond to the operations of block 136 of FIG. 4B. Finally, the quantum search service 76 sends a search response, such as the search response 80 of FIG. 1, to the requestor 68 indicating that the one or more data values of the plurality of data values 36 and 38 correspond to the search pattern 98 (block 150).

Figure 5:
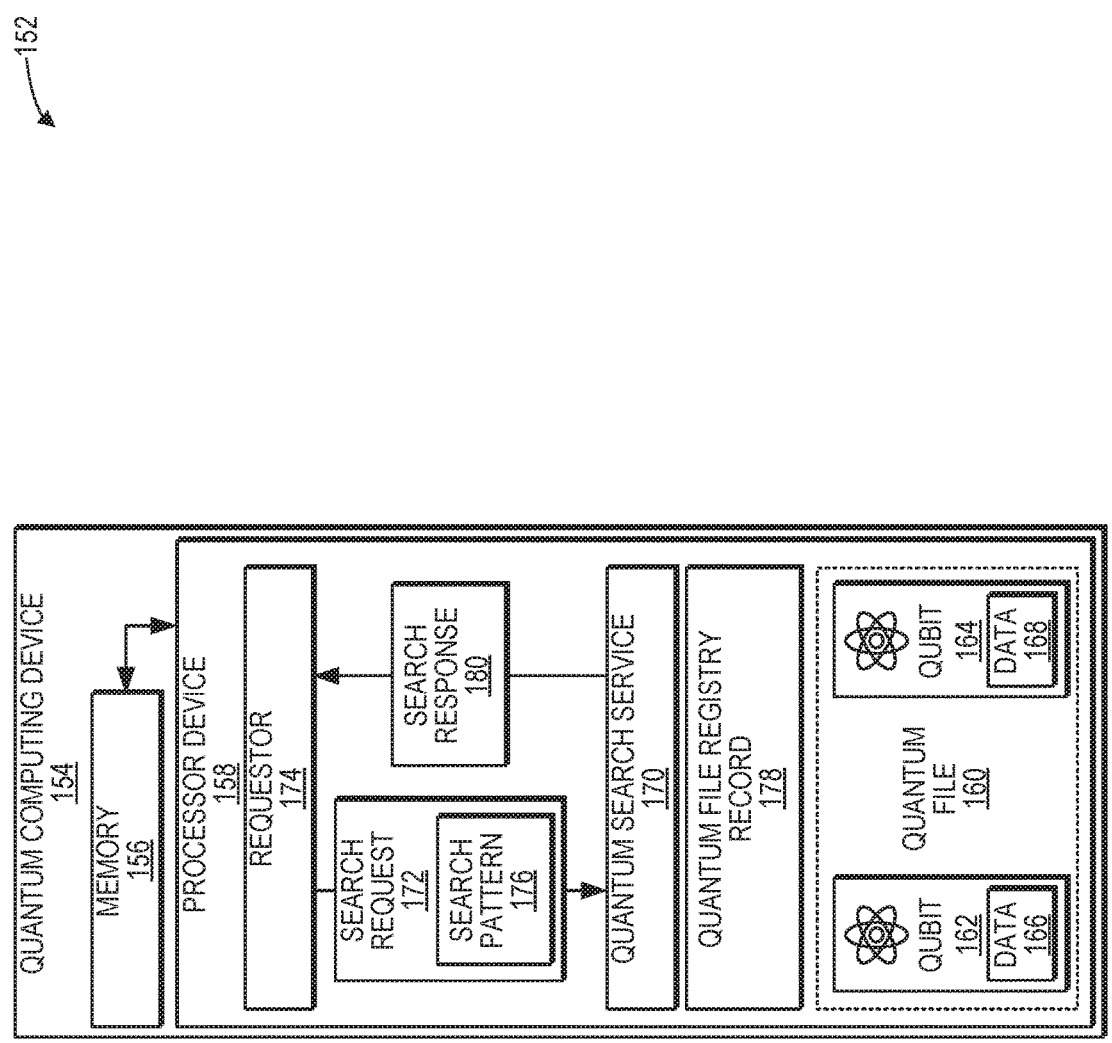
FIG. 5 is a simpler block diagram of the quantum computing system of FIG. 1 for performing quantum file pattern searching, according to one example.

FIG. 5 is a simpler block diagram of the quantum computing system 10 of FIG. 1 for performing quantum file pattern searching, according to one example. In the example of FIG. 5, a quantum computing system 152 includes a quantum computing device 154 that comprises a system memory 156 and a processor device 158. The quantum computing system 152 implements a quantum file 160 that is made up of two (2) qubits: a qubit 162 and a qubit 164. The qubit 162 stores a data value ("DATA") 166, while the qubit 164 stores a data value ("DATA") 168.

The quantum computing device 154 implements a quantum search service 170 that provides quantum pattern search functionality. The quantum search service 170 is executed by the processor device 158, and receives a search request 172 from a requestor 174 to perform a pattern search. The search request 172 includes a search pattern 176 to which the qubits of quantum files will be compared. Upon receiving the search request 172, the quantum search service 170 accesses a quantum file registry record 178 of the quantum file 160 to be searched. The quantum search service 170 uses the quantum file registry record 178 to identify the plurality of qubits 162 and 164 of the quantum file 160, and also to identify a location of each of the qubits 162 and 164. The quantum search service 170 then accesses the data values 166 and 168 stored in the qubits 162 and 164, respectively, and compares the data values 166 and 168 to the search pattern 176 of the search request 172.

If the quantum search service 170 determines that the data values 166 and 168 correspond to the search pattern 176 of the search request 172, the quantum search service 170 sends a search response 180 to the requestor 174. The search response 180 indicates to the requestor 174 that the data values 166 and 168 correspond to the search pattern 176 of the search request 172.

Figure 6:
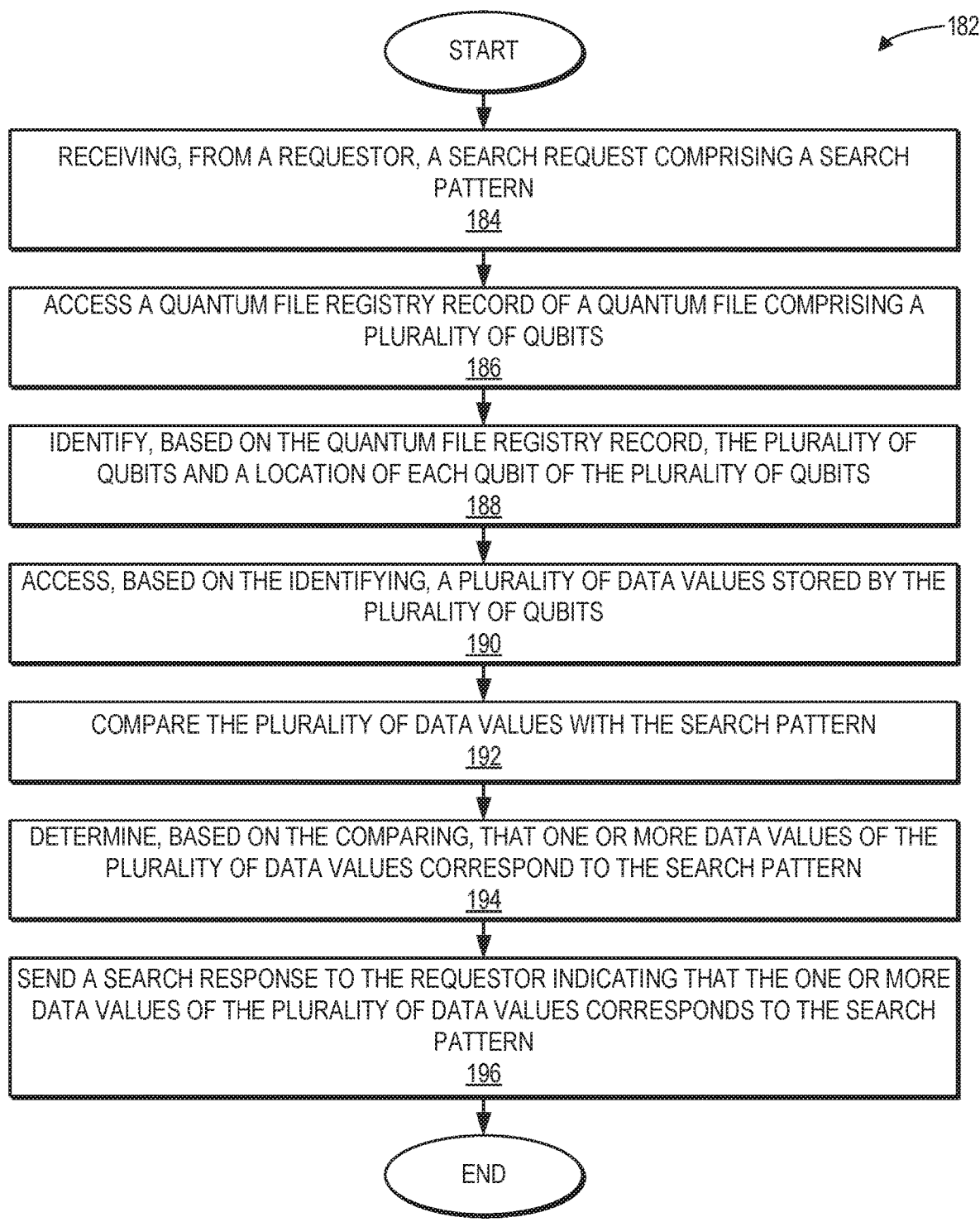
FIG. 6 is a flowchart of a simplified method for performing pattern searching of quantum files in the quantum computing system of FIG. 5, according to one example.

FIG. 6 provides a flowchart 182 of a simplified method for performing quantum file pattern searching in the quantum computing system 152 of FIG. 5, according to one example. For the sake of clarity, elements of FIG. 5 are referenced in describing FIG. 6. In FIG. 6, operations begin with the quantum search service 170 receiving, from the requestor 174, the search request 172 comprising the search pattern 176 (block 184). The quantum search service 170 accesses the quantum file registry record 178 of the quantum file 160 comprising the plurality of qubits 162 and 164 (block 186). The quantum search service 170 then identifies, based on the quantum file registry record 178, the plurality of qubits 162 and 164 and a location of each qubit of the plurality of qubits 162 and 164 (block 188).

The quantum search service 170 next accesses, based on the identifying, the plurality of data values 166 and 168 stored by the plurality of qubits 162 and 164 (block 190). The quantum search service 170 compares the plurality of data values 166 and 168 with the search pattern 176 (block 192). The quantum search service 170 determines, based on the comparing, that one or more data values of the plurality of data values 166 and 168 correspond to the search pattern 176 (block 194). The quantum search service 170 then sends the search response 180 to the requestor 174 indicating that the one or more data values of the plurality of data values 166 and 168 correspond to the search pattern 176 (block 196).

Figure 7:
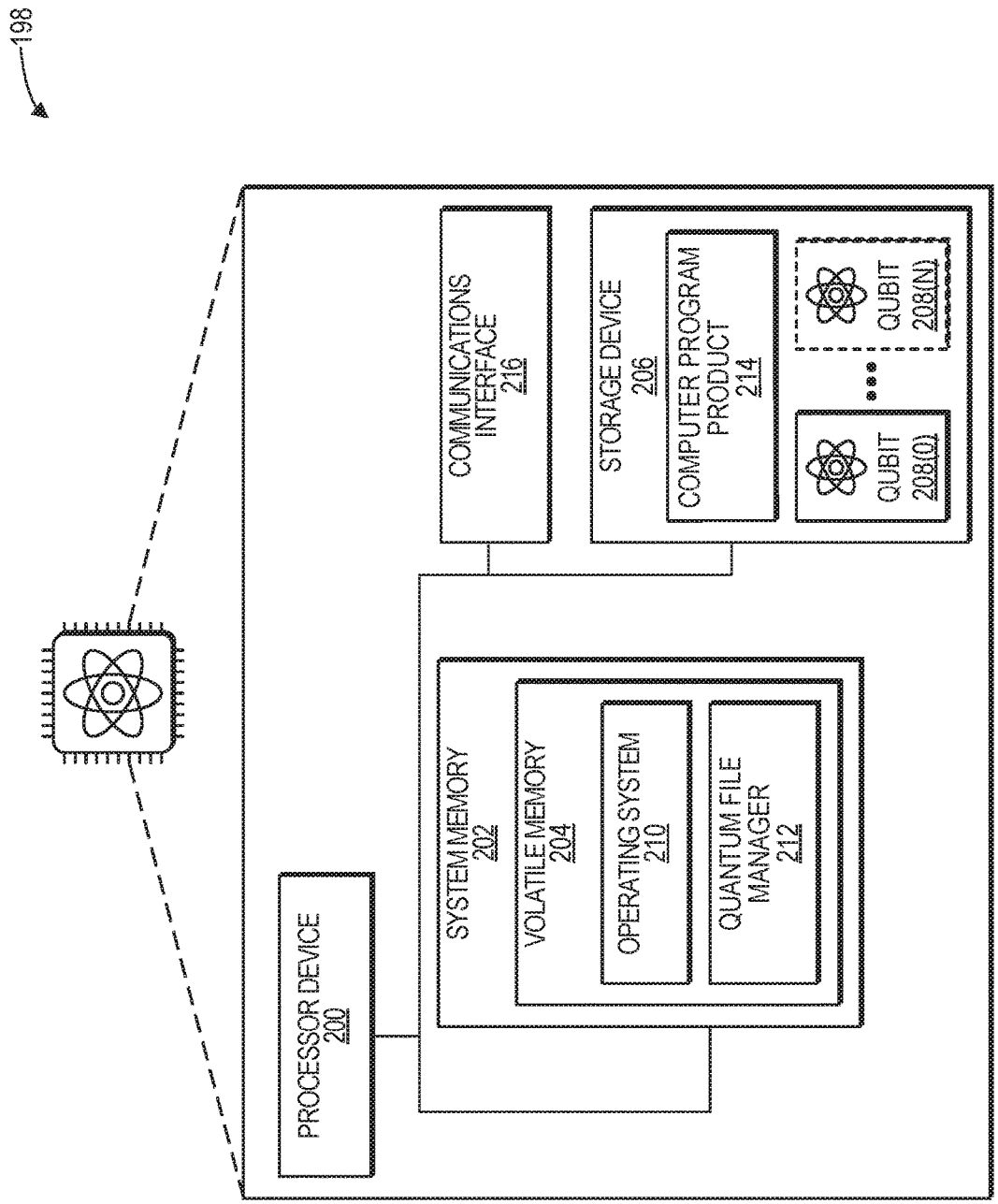
FIG. 7 is a block diagram of a quantum computing device suitable for implementing examples, according to one example.

FIG. 7 is a block diagram of a quantum computing device 198, such as the quantum computing device 12 and the quantum computing device 18 of FIG. 1, suitable for implementing examples according to one example. The quantum computing device 198 may comprise any suitable quantum computing device or devices. The quantum computing device 198 can operate using classical computing principles or quantum computing principles. When using quantum computing principles, the quantum computing device 198 performs computations that utilize quantum-mechanical phenomena, such as superposition and entanglement. The quantum computing device 198 may operate under certain environmental conditions, such as at or near zero degrees) (0°) Kelvin. When using classical computing principles, the quantum computing device 198 utilizes binary digits that have a value of either zero (0) or one (1).

The quantum computing device 198 includes a processor device 200 and the system memory 202. The processor device 200 can be any commercially available or proprietary processor suitable for operating in a quantum environment.

The system memory 202 may include volatile memory 204 (e.g., random-access memory (RAM)). The quantum computing device 198 may further include or be coupled to a non-transitory computer-readable storage medium such as a storage device 206, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 206 and other drives associated with computer-readable media and computer-usable media may provide non-volatile storage of data, data structures, computer-executable instructions, and the like. The storage device may also provide functionality for storing one or more qubits 208(0)-208(N).

A number of modules can be stored in the storage device 206 and in the volatile memory 204, including an operating system 210 and one or more modules, such as a quantum file manager 212. All or a portion of the examples may be implemented as a computer program product 214 stored on a transitory or non-transitory computer-usable or computer-readable storage medium, such as the storage device 206, which includes complex programming instructions, such as complex computer-readable program code, to cause the processor device 200 to carry out the steps described herein. Thus, the computer-readable program code can comprise software instructions for implementing the functionality of the examples described herein when executed on the processor device 200. An operator may also be able to enter one or more configuration commands through a keyboard (not illustrated), a pointing device such as a mouse (not illustrated), or a touch-sensitive surface such as a display device. The quantum computing device 198 may also include a communications interface 216 suitable for communicating with a network as appropriate or desired.

What is claimed is:

1. A method comprising:
receiving, from a requestor, a search request comprising a search pattern;
accessing a quantum file registry record of a quantum file comprising a plurality of qubits;
identifying, based on the quantum file registry record, the plurality of qubits and a location of each qubit of the plurality of qubits;
accessing, based on the identifying, a plurality of data values stored by the plurality of qubits;
comparing the plurality of data values with the search pattern;
determining, based on the comparing, that one or more data values of the plurality of data values correspond to the search pattern; and
sending a search response to the requestor indicating that the one or more data values of the plurality of data values correspond to the search pattern.

2. The method of claim 1, wherein the search request further comprises one or more of an identification of the quantum file to be searched, an identification of one or more locations to be searched, and an identification of the plurality of qubits to be searched.

3. The method of claim 1, wherein the search response comprises one or more of an identification of the quantum file and an identification of one or more qubits of the plurality of qubits that store the one or more data values corresponding to the search pattern.

4. The method of claim 1, wherein:
the search pattern comprises one or more literals; and
determining that the one or more data values of the plurality of data values correspond to the search pattern comprises determining that each data value of the one or more data values equals a corresponding literal of the one or more literals.

5. The method of claim 1, wherein:
the search pattern comprises a regular expression; and
determining that the one or more data values of the plurality of data values correspond to the search pattern comprises determining that the one or more data values match the regular expression.

6. The method of claim 1, further comprising obtaining exclusive access to the plurality of qubits.

7. The method of claim 1, further comprising determining that each qubit of the plurality of qubits is in an entanglement state of not entangled;
wherein accessing the plurality of data values stored by the plurality of qubits is responsive to determining that each qubit of the plurality of qubits is in an entanglement state of not entangled.

8. The method of claim 1, further comprising determining that any qubit of the plurality of qubits is in a state of superposition;
wherein:
accessing the plurality of data values stored by the plurality of qubits comprises performing a plurality of accesses of each data value of the plurality of data values;
comparing the plurality of data values with the search pattern comprises performing a plurality of comparisons of the plurality of data values with the search pattern; and
determining that the one or more data values of the plurality of data values correspond to the search pattern comprises:
determining a number of the plurality of comparisons in which the one or more data values of the plurality of data values match the search pattern; and
determining that the number of the plurality of comparisons exceeds a comparison threshold.

9. The method of claim 1, further comprising determining that each qubit of the plurality of qubits is not in a state of superposition;
wherein accessing the plurality of data values stored by the plurality of qubits is responsive to determining that each source qubit of the plurality of source qubits is not in a state of superposition.

10. The method of claim 1 wherein the search request identifies a quantum file of a plurality of quantum files, and further comprising:
determining, based on the search request, the quantum file registry record of a plurality of quantum file registry records maintained in a quantum file registry, each quantum file registry record corresponding to a different quantum file, each different quantum file comprising one or more qubits.

11. A quantum computing system, comprising:
a quantum computing device comprising:
a memory; and
at least one processor device coupled to the memory to:
receive, from a requestor, a search request comprising a search pattern;
access a quantum file registry record of a quantum file comprising a plurality of qubits;
identify, based on the quantum file registry record, the plurality of qubits and a location of each qubit of the plurality of qubits;
access, based on the identifying, a plurality of data values stored by the plurality of qubits;
compare the plurality of data values with the search pattern;
determine, based on the comparing, that one or more data values of the plurality of data values correspond to the search pattern; and
send a search response to the requestor indicating that the one or more data values of the plurality of data values correspond to the search pattern.

12. The method of claim 11, wherein the search request further comprises one or more of an identification of the quantum file to be searched, an identification of one or more locations to be searched, and an identification of the plurality of qubits to be searched.

13. The method of claim 11, wherein the search response comprises one or more of an identification of the quantum file and an identification of one or more qubits of the plurality of qubits that store the one or more data values corresponding to the search pattern.

14. The quantum computing system of claim 11, wherein:
the search pattern comprises one or more literals; and
to determine that the one or more data values of the plurality of data values correspond to the search pattern is to determine that each data value of the one or more data values equals a corresponding literal of the one or more literals.

15. The quantum computing system of claim 11, wherein:
the search pattern comprises a regular expression; and
to determine that the one or more data values of the plurality of data values correspond to the search pattern is to determine that the one or more data values match the regular expression.

16. The quantum computing system of claim 11, wherein the at least one processor device is further to obtain exclusive access to the plurality of qubits.

17. The quantum computing system of claim 11, wherein:
the at least one processor device is further to determine that each qubit of the plurality of qubits is in an entanglement state of not entangled; and
the at least one processor device is to access the plurality of data values stored by the plurality of qubits responsive to determining that each qubit of the plurality of qubits is in an entanglement state of not entangled.

18. The quantum computing system of claim 11, wherein:
the at least one processor device is further to determine that any qubit of the plurality of qubits is in a state of superposition;
to access the plurality of data values stored by the plurality of qubits is to perform a plurality of accesses of each data value of the plurality of data values;
to compare the plurality of data values with the search pattern is to perform a plurality of comparisons of the plurality of data values with the search pattern; and
to determine that the one or more data values of the plurality of data values correspond to the search pattern is to:
determine a number of the plurality of comparisons in which the one or more data values of the plurality of data values match the search pattern; and
determine that the number of the plurality of comparisons exceeds a comparison threshold.

19. The quantum computing system of claim 11, wherein:
the at least one processor device is further to determine that each qubit of the plurality of qubits is not in a state of superposition; and the at least one processor device is to access the plurality of data values stored by the plurality of qubits responsive to determining that each source qubit of the plurality of source qubits is not in a state of superposition.

20. A computer program product comprising a non-transitory computer-readable medium having stored thereon computer-executable instructions which, when executed, cause a processor device to:
- receive, from a requestor, a search request comprising a search pattern;
- access a quantum file registry record of a quantum file comprising a plurality of qubits;
- identify, based on the quantum file registry record, the plurality of qubits and a location of each qubit of the plurality of qubits;
- access, based on the identifying, a plurality of data values stored by the plurality of qubits;
- compare the plurality of data values with the search pattern;
- determine, based on the comparing, that one or more data values of the plurality of data values correspond to the search pattern; and
- send a search response to the requestor indicating that the one or more data values of the plurality of data values correspond to the search pattern.

\* \* \* \* \*